US009058963B2

(12) United States Patent
Makarov et al.

(10) Patent No.: US 9,058,963 B2
(45) **Date of Patent: *Jun. 16, 2015**

(54) PARALLEL MASS ANALYSIS

(71) Applicant: Thermo Fisher Scientific (Bremen) GmbH, Bremen (DE)

(72) Inventors: Alexander A. Makarov, Bremen (DE); Stevan R. Horning, Delmenhorst (DE)

(73) Assignee: Thermo Fisher Scientific (Bremen) GmbH, Bremen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/198,413

(22) Filed: Mar. 5, 2014

(65) Prior Publication Data

US 2014/0183352 A1 Jul. 3, 2014

Related U.S. Application Data

(63) Continuation of application No. 13/970,310, filed on Aug. 19, 2013, now Pat. No. 8,692,189, which is a continuation of application No. 13/164,693, filed on Jun. 20, 2011, now Pat. No. 8,513,595, which is a continuation of application No. 12/521,688, filed as application No. PCT/EP2007/011429 on Dec. 27, 2007, now Pat. No. 7,985,950.

(30) Foreign Application Priority Data

Dec. 29, 2006 (GB) .................................. 0626027.7

(51) Int. Cl.
*H01J 49/26* (2006.01)
*H01J 27/02* (2006.01)
*B01D 59/44* (2006.01)

(Continued)

(52) U.S. Cl.
CPC ............ *H01J 49/009* (2013.01); *H01J 49/425* (2013.01)

(58) Field of Classification Search
CPC . H01J 49/0031; H01J 49/4225; H01J 49/004; H01J 49/36; H01J 49/4235; H01J 49/005; H01J 49/0481; H01J 49/062; H01J 49/063; H01J 49/00
USPC .......................... 250/283, 281, 282, 288, 292
See application file for complete search history.

(56) References Cited

U.S. PATENT DOCUMENTS 5,886,346 A 3/1999 Makarov
5,998,215 A 12/1999 Prather et al.
6,762,406 B2 7/2004 Cooks et al.

(Continued)

FOREIGN PATENT DOCUMENTS

GB 2406434 A 3/2005
WO WO 2004/068523 A2 8/2004
WO WO 2005/031290 A2 4/2005

*Primary Examiner* — Nikita Wells
(74) *Attorney, Agent, or Firm* — Charles B. Katz

(57) ABSTRACT

A system and method of mass spectrometry is provided. Ions from an ion source are stored in a first ion storage device and in a second ion storage device. Ions are ejected from the first ion storage device to a first mass analysis device during a first ejection time period, for analysis during a first analysis time period. Ions are ejected from the second ion storage device to a second mass analysis device during a second ejection time period. The ion storage devices are connected in series such that an ion transport aperture of the first ion storage device is in communication with an ion transport aperture of the second ion storage device. The first analysis time period and the second ejection time period at least partly overlap.

12 Claims, 3 Drawing Sheets

(51) Int. Cl.
*H01J 49/00* (2006.01)
*H01J 49/42* (2006.01)

(56) References Cited

U.S. PATENT DOCUMENTS

| | | | | |
|---|---|---|---|---|
| 6,872,938 | B2 | 3/2005 | Makarov et al. | |
| 6,900,430 | B2 | 5/2005 | Okumura et al. | |
| 7,449,686 | B2 * | 11/2008 | Wang et al. | 250/292 |
| 7,829,842 | B2 | 11/2010 | Makarov | |
| 7,858,929 | B2 | 12/2010 | Makarov et al. | |
| 8,410,424 | B2 * | 4/2013 | Makarov et al. | 250/281 |
| 8,513,595 | B2 * | 8/2013 | Makarov et al. | 250/283 |
| 8,686,350 | B2 * | 4/2014 | Makarov et al. | 250/282 |
| 8,692,189 | B2 * | 4/2014 | Makarov et al. | 250/283 |
| 2002/0068366 | A1 | 6/2002 | LaDine et al. | |
| 2002/0175278 | A1 | 11/2002 | Whitehouse | |

* cited by examiner

PARALLEL MASS ANALYSIS

CROSS-REFERENCE TO RELATED APPLICATIONS

The present application is a continuation under 35 U.S.C. §120 and claims the priority benefit of co-pending U.S. patent application Ser. No. 13/970,310 filed Aug. 19, 2013, which is a continuation under 35 U.S.C. §120 and claims the priority benefit of U.S. patent application Ser. No. 13/164,693 filed Jun. 20, 2011, now U.S. Pat. No. 8,513,595, which is a continuation under 35 U.S.C. §120 and claims the priority benefit of U.S. patent application Ser. No. 12/521,688 filed Jun. 29, 2009, now U.S. Pat. No. 7,985,950, which is a National Stage application under 35 U.S.C. §371 of PCT Application No. PCT/EP2007/011429, filed Dec. 27, 2007, which claims the priority benefit of GB0626027.7 filed Dec. 29, 2006. The disclosures of each of the foregoing applications are incorporated herein by reference.

TECHNICAL FIELD

This invention relates to a method of mass spectrometry and a mass spectrometer comprising more than one mass analyser to be operated at the same time.

BACKGROUND TO THE INVENTION

A mass spectrometer with multiple, independent stages of mass analysis can be used to increase throughput, speed of analysis and mass range in providing high resolution mass spectra, without imposing otherwise unavoidable and unrealistic requirements on a single analyser. This requirement is true for many different types of ion sources, including atmospheric pressure ion sources like APCI, API, ESI, MALDI as well as vacuum ion sources like EI, CI, v-MALDI, laser-desorption, SIMS and many others. Parallel analysis is especially effective for cases when analysis has low duty cycle, i.e. ratio of analyser fill time to analysis time is much less than 1. Advantageously, multiple stages may be used to analyse ions generated by a single ion source, in order that as little of the sample material be wasted as possible.

Sequential operation of mass analysers may increase specificity or mass range of analysis, but the throughput is limited by the capacity of the first mass analyser in the sequence. In contrast, parallel operation of mass analysers increases throughput and speed of analysis.

US-A-2002068366 relates to use of an array of parallel mass spectrometers to increase sample throughput for proteomic analysis. To allow flexibility, the mass spectrometers do not share components and the mass spectrometers each receive ions from an individual source. Hence, the mass spectrometers may be of different types.

Sharing analytical components between the stages of mass analysis may provide efficiency gains and cost reductions, although at the expense of this adaptability. An example of this loss of flexibility is U.S. Pat. No. 6,762,406, which describes an array of RF ion traps in parallel with a single ion source. The ion source is used either to fill one or more traps from an individual ion source or to fill multiple traps at once. This arrangement allows the source and traps to be housed in the same vacuum environment but it does not address the problem of low duty cycle because traps operate in parallel.

Parallel operation of different mass analysers connected sequentially can improve throughput, as shown in WO2005031290, but performance is still limited by the slowest detector in the chain.

Hence, existing methods and apparatus are unable to provide mass spectra from a single ion source using parallel mass analysers in an efficient way.

SUMMARY OF THE INVENTION

Against this background, the present invention provides in a first aspect a method of mass spectrometry comprising: generating ions in an ion source; storing ions from the ion source in a first ion storage device, having at least an ion transport aperture, during a first ion storage time; ejecting ions from the first ion storage device to a first mass analysis device during a first ejection time period, for analysis during a first analysis time period; storing ions from the ion source in a second ion storage device, having at least an ion transport aperture, during a second ion storage time; and ejecting ions from the second ion storage device to a second mass analysis device during a second ejection time period, for analysis during a second analysis time period. The ion storage devices are connected in series such that the ion transport aperture of the first ion storage device is in communication with the ion transport aperture of the second ion storage device so as to allow transfer of ions between the first and second ion storage devices. Moreover, the first analysis time period and the second ejection time period at least partly overlap.

The ion storage devices are connected in such a way that one of the ion storage devices, a transmitting ion storage device, receives ions from the ion source without those ions passing through another ion storage device. In contrast, ions flow from the ion source to the other ion storage device through the transmitting ion storage device.

Then optionally, according to this first aspect, the ion transport aperture of the first ion storage device is an ion entrance aperture and the ion transport aperture of the second ion storage device is an ion exit aperture, such that preceding the first ion storage time, ions enter the first ion storage device by passing through the second ion storage device. Then, preceding the second ion storage time, ions enter the second ion storage device without passing via the first ion storage device.

Alternatively according to this first aspect, the ion transport aperture of the first ion storage device is an ion exit aperture and the ion transport aperture of the second ion storage device is an ion entrance aperture, such that, preceding the first ion storage time, ions enter the first ion storage device without passing through the second ion storage device. Then, preceding the second ion storage time, ions enter the second ion storage device by passing via the first ion storage device.

Optionally, the first and second ion storage times do not overlap.

In a second aspect, the present invention provides a method of mass spectrometry comprising: generating ions in an ion source; storing ions from the ion source in a first storage volume of an ion storage device, during a first ion storage time; ejecting ions from the first ion storage device to a first mass analysis device during a first ejection time period, for analysis during a first analysis time period; storing ions from the ion source in a second storage volume of the ion storage device during a second ion storage time, the second storage volume at least partly overlapping with said first storage volume; and ejecting ions from the ion storage device to a second mass analysis device during a second ejection time period, for analysis during a second analysis time period; wherein the first analysis time period and the second ejection time period at least partly overlap.

According to this second aspect of the present invention, optionally the ion storage device comprises a common entrance aperture to said first storage volume and said second storage volume, and wherein ions from the ion source enter the ion storage device through said common entrance aperture. Additionally or alternatively, the steps of ejecting ions to a first mass analysis device and ejecting ions to a second mass analysis device comprise ejecting ions from the ion storage device through a single slit.

The first storage volume of the ion storage device and the second storage volume of the ion storage device preferably completely overlap. A single trapping field is possible although not necessary, as multiple trapping fields can be used. However in such a case, the ions are held within a defined trapping volume such that the storage volume for ions for the first mass analysis device at least partly overlaps with the storage volume for ions for the second mass analysis device, thereby defining a single ion storage device.

According to all these aspects of the present invention, an ion source may be used with multiple mass analysers in an efficient way. The use of an ion source and ion storage device shared between more than one mass analysis device is advantageously provided without reduction in throughput over a mass spectrometer with multiple ion sources and ion storage devices operative in parallel.

Specifically, this is achieved by recognition that the time needed to analyse a sample of ions by a mass analyser is greater than that needed to store the number of ions sufficient for such an analysis. Hence, efficiency is increased by using the ion storage device arrangement to provide ions to one mass analyser, whilst another mass analyser performs an analysis. In this way, the parallel mass analysers can efficiently analyse ions generated by a single ion source, whilst allowing the mass spectrometer to be more adaptable than existing techniques. For example the mass analysers may be of different types or they may form part of an apparatus for $MS^n$ experiments. Moreover, the ion storage device is able to provide a stepped change in conditions from the source to the mass analyser, for instance with respect to temperature or pressure conditions.

In the preferred embodiments of the present invention, ions are first stored in an ion storage device in a first ion storage time period. Ions are then ejected from the ion storage device to the first mass analysis device during a first ion ejection time period. The mass analysis device performs an analysis of the ejected ions during a first mass analysis time period. Ions are stored in an ion storage device during a second ion storage time period. Ions are then ejected from the ion storage device to a second mass analysis device during a second ion ejection time period. This second ion ejection time period at least partly overlaps with the first mass analysis time period. Preferably, the first analysis time period and the second ejection time period overlap by at least 10% and optionally by at least 25%, 50% or 75%. In the preferred embodiment, the first analysis time period begins before the second analysis time period starts and the first analysis time period ends after the second analysis time period ends.

Optionally, the first analysis time period and the second analysis time period at least partly overlap. In this case, the first mass analysis device and second mass analysis device perform analyses at the same time. Advantageously, the second ion storage time and first mass analysis time at least partly overlap. This allows increased efficiency in the operation of the multiple mass analysis devices.

Optionally, the ion source is an atmospheric pressure ion source. In this case, the ion storage provides an additional advantage in allowing the ion stream to be adapted to a reduced pressure for mass analysis.

Alternatively, the ion source is an APCI, API, ESI, MALDI, EI, CI, laser-desorption, SIMS EI/CI ion source or a vacuum MALDI ion source.

In an alternative embodiment, ejecting ions to a first mass analysis device preferably comprises ejecting ions from the ion storage device; and deflecting the ejected ions into the first mass analysis device. Additionally or alternatively, ejecting ions to a second mass analysis device may comprise: ejecting ions from the ion storage device; and deflecting the ejected ions into the second mass analysis device. Advantageously, the steps of ejecting ions to a first mass analysis device and ejecting ions to a second mass analysis device comprise ejecting ions from the ion storage device through a single opening.

The first mass analysis device is preferably an Orbitrap mass analyser, although alternatively the first mass analysis device may be an RF ion trap, a Fourier Transform Ion Cyclotron Resonance mass analyser, a multi-reflection or a multi-sector time-of-flight mass analyser. In the preferred embodiment, the second mass analysis device is of the same type as the first mass analysis device. Alternatively, the second mass analysis device is of a different type to the first mass analysis device.

The method may optionally be generalised to ejecting ions from the ion storage device to N mass analysis devices during N respective ejection time periods and for analysis during N respective analysis time periods. N may be any positive integer and N≥2. The mass analysis devices are arranged in an order, such that they can be numbered from 1 to N. Then, for 1≤n≤N, the $n^{th}$ analysis time period and the $(n+1)^{th}$ ejection time period at least partly overlap.

For example, if N=4, ion packets are ejected from the ion storage device to a first mass analysis device during a first ejection time period, a second mass analysis device during a second ejection time period, a third mass analysis device during a third ejection time period and a fourth mass analysis device during a fourth ejection time period. Each mass analyser also has a respective analysis time periods. As previously described, the first analysis time period and the second ejection time period at least partly overlap. Moreover, the second analysis time period and the third ejection time period, and the third analysis time period and the fourth ejection time period also at least partly overlap. Optionally, the first analysis time period and third ejection time period may also overlap.

Optionally, the method may further comprise storing ions from the ion source in a preliminary ion storage device; and analysing the ions stored in the preliminary ion storage device. The analysis performed during the first analysis time period and second analysis time period can then be based on the results of the step of analysing the ions stored in the preliminary ion storage device.

The preliminary ion storage device can be operated as a mass spectrometer, in a similar fashion to that described in WO-A-2005/031290, the preliminary ion storage comprising a detector. Preferably, the preliminary ion storage device is the same as the first ion storage device. However, optionally it may be a different ion storage device, in which case the preliminary ion storage device ejects at least some of the ions to another ion storage device, which may be the first ion storage device or second ion storage device of the first aspect of the present invention, the ion storage device of the second aspect of the present invention, or a different ion storage device.

In using a preliminary ion storage device, the detector associated with it and additionally, or alternatively any of the detectors associated with the plurality of mass analysis devices, can be used to generate initial mass spectrum information. This initial mass spectrum information may be used for subsequent scans, for example, to generate AGC information as described in WO-A-2004/068523, or including preview information as described in WO-A-2005/031290.

The present invention may also be found in a method of mass spectrometry comprising: generating ions in an ion source; and performing the following steps for each of a plurality of mass analysis devices. The steps are storing ions from the ion source in an ion storage device during a respective storage time period; and ejecting ions from the ion storage device to the respective mass analysis device, the mass analysis device being arranged to analyse the respective ejected ions during a respective analysis time period. The number of mass analysis devices comprising the plurality of mass analysis devices is substantially equal to or greater than the ratio of the analysis time period to a representative storage time period, the representative storage time period being based on at least one of the respective storage time periods for each of the plurality of mass analysis devices. The optional, preferable, advantageous and further features common to the first and second aspects of the present invention may additionally be incorporated with this method and an associated apparatus.

Optionally, the representative storage time period is the average storage time period over the plurality of mass analysis devices. Alternatively, it is the shortest storage time period over the plurality of mass analysis devices or the longest storage time period over the plurality of mass analysis devices. The representative storage time period may alternatively be some other function of the respective storage time period for at least some of the plurality of mass analysis devices.

The present invention also resides in a mass spectrometry system comprising: an ion source; a first mass analysis device, arranged to analyse ions during a first analysis time period; a second mass analysis device, arranged to analyse ions during a second analysis time period; a first ion storage device, arranged to store ions and having at least an ion transport aperture; a second ion storage device, arranged to store ions and having at least an ion transport aperture, the second ion storage device being connected in series with the first ion storage device, such that the ion transport aperture of the first ion storage device is in communication with the ion transport aperture of the second ion storage device so as to allow transfer of ions between the first and second ion storage devices; and a system controller, arranged to control the first ion storage device to store ions in the first ion storage device in a first storage time and to eject said ions to the first mass analysis device during a first ejection time period, the system controller being further arranged to control the second ion storage device to store ions from the ion source in the second ion storage device in a second storage time and to eject said ions to the second mass analysis device during a second ejection time period, which at least partly overlaps with the first analysis time period.

The present invention might alternatively be found in a mass spectrometry system comprising: an ion source; a first mass analysis device, arranged to analyse ions during a first analysis time period; a second mass analysis device, arranged to analyse ions during a second analysis time period; an ion storage device, arranged to store ions in a first storage volume and further arranged to store ions in a second storage volume, the second storage volume at least partly overlapping with said first storage volume; and a system controller, arranged to control the ion storage device to store ions from the ion source in the first storage volume in a first storage time and to eject said ions to the first mass analysis device during a first ejection time period, the system controller being further arranged to control the ion storage device to store ions from the ion source in the second storage volume in a second storage time and to eject said ions to the second mass analysis device during a second ejection time period, which at least partly overlaps with the first analysis time period.

In the preferred embodiment of either form of mass spectrometry system, the first mass analysis device and second mass analysis device share a common housing. Optionally, the first mass analysis device and second mass analysis device may share a common pumping arrangement.

Optionally, the system controller is arranged to distribute ions between the plurality of mass analysis devices and to schedule analysis activities between the plurality of mass analysis devices. Analysis activities may include measurement. The system controller may include a scheduler that operates according to predefined conditions. Alternatively, the system controller may comprise means to optimise utilization of the system dependent on the ion stream and measurement data. This can include scheduling of events between the mass analysis devices, as well as generation of product ions and distribution of the product ions to different detectors, including the ion storage device. In a preferred mode of operation the system automatically selects a best mode of maximum ion utilization and information output based on user defined constraints like e.g. desired parent ions, uninteresting parent ions, neutral loss masses and method-based constraints like an expected or detected chromatographic peak width or relations between previously detected ions.

BRIEF DESCRIPTION OF THE DRAWINGS

The invention may be put into practice in various ways, one of which will now be described by way of example only and with reference to the accompanying drawings in which.

SPECIFIC DESCRIPTION OF A PREFERRED EMBODIMENT

Figure 1:
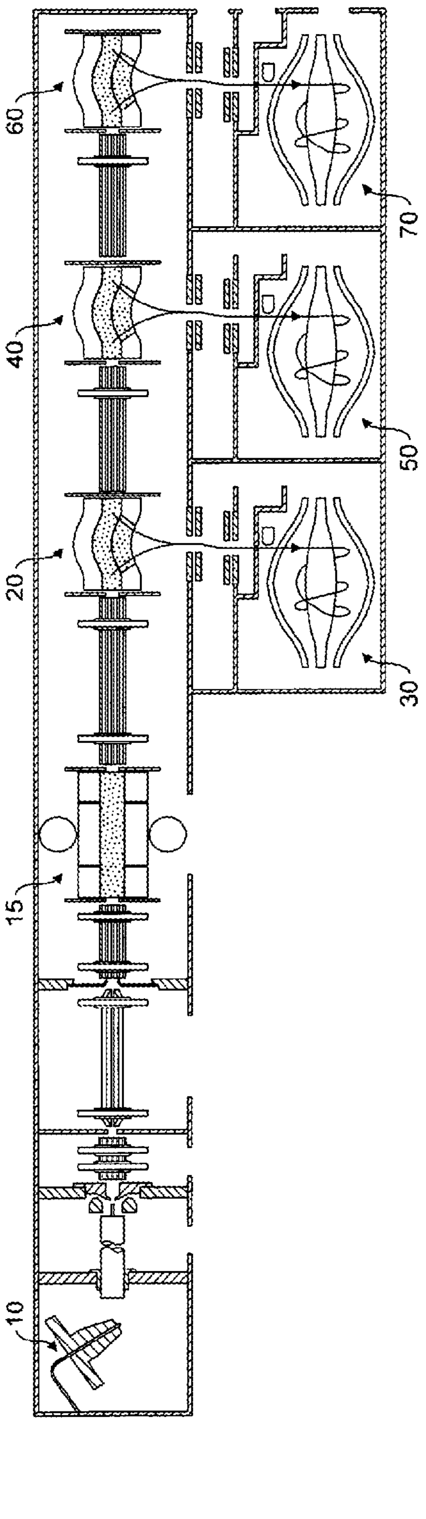
FIG. 1 shows a first embodiment of a mass spectrometer according to the present invention.

Referring first to FIG. 1, a mass spectrometer according to the present invention is shown. The mass spectrometer comprises: an ion source 10; a preliminary ion storage device 15; a first ion storage device 20; a first mass analysis device 30; a second ion storage device 40; a second mass analysis device 50; a third ion storage device 60; and a third mass analysis device 70. Each of the mass analysis devices is an Orbitrap mass analyser, as described in U.S. Pat. No. 5,886,346. The preliminary ion storage device 15 is an ion trap.

Ions are generated in the ion source 10 and are ejected from the source into preliminary ion storage 15 and from there into first ion storage device 20. The first ion storage device 20 is arranged to store ions to be analysed by the first mass analysis device 30 in a first storage time period. Ion storage device 20 maintains an appropriate pressure and temperature, such that the stored ions will be suitable for analysis by the first mass analysis device 30. The first ion storage device 20 then injects the stored ions into the first mass analysis device 30 during a first ejection time period.

The second ion storage device 40 then stores ions for analysis by the second mass analysis device 50 during a second storage time period. These ions preferably flow through the first ion storage device 20 without being stored therein, although they may initially be stored by the first ion storage device 20. The first mass analysis device 30 performs some analysis of the injected ions during a first analysis time period.

The second ion storage device 40 receives the ejected ions from the exit aperture of the first ion storage device 20. As described, it stores ions to be analysed by the second mass analysis device 50 and maintains an appropriate pressure and temperature, such that the stored ions will be suitable for analysis by the second mass analysis device 50. It then injects the stored ions into the second mass analysis device 50 during a second ejection time period. The second ejection time period at least partly overlaps with the first analysis time period. Hence, whilst the first mass analysis device 30 is performing an analysis, the second mass analysis device 50 is being filled with ions. This allows the mass spectrometer to be operated with increased efficiency. The second storage time period may also overlap with the first analysis time period.

The third ion storage device 60 receives ions for the third mass analysis device 70. The second mass analysis device 50 performs some analysis of the injected ions during a second analysis time period.

The third ion storage device 60 receives the transmitted ions from the exit aperture of the second ion storage device 40 and stores these ions. Again, these preferably flow through the first storage device 20 and second storage device 40 without being stored, although they may be stored by the first storage device 20 and/or second storage device 40 initially. It maintains an appropriate pressure and temperature, such that the stored ions will be suitable for analysis by the third mass analysis device 70. It then injects the stored ions into the third mass analysis device 70 during a third ejection time period. The third mass analysis device 70 performs some analysis of the injected ions during a third analysis time period.

The configuration shown in FIG. 1 may be used in another, preferred mode. Ions are prepared in the ion trap 15, where they may also be detected, for example to determine the intensity of the incoming stream of ions from the source.

In a most straightforward embodiment the ions are distributed to the different detectors one after the other in turn, as described above. The best number of detectors is in this case determined by the time and overhead for ion accumulation compared with the total detection time.

In a more sophisticated implementation after a full mass scan, precursor ions determined from the preceding scan can be selected in the ion trap 15 and product ions can be formed in the ion trap 15 or a subsequent ion modification device, preferably downstream of the ion trap. These product ions are then detected in the next free mass analysis device.

Either a pre-scan from the ion trap 15 can be used for data dependent information or a complete dataset from one of the detectors, or a "preview" dataset from one of the detectors.

In an alternative mode of operation, the second storage device 40 may first be filled and the second mass analysis device 50 may first be operated. Whilst the second mass analysis device 50 is performing an analysis, the first ion storage device 20 may then be filled, such that the first storage time period and second mass analysis time period at least partly overlap. Alternatively, the third storage device 60 may initially be filled and the second storage time period and third mass analysis time period may at least partly overlap.

Figure 2:
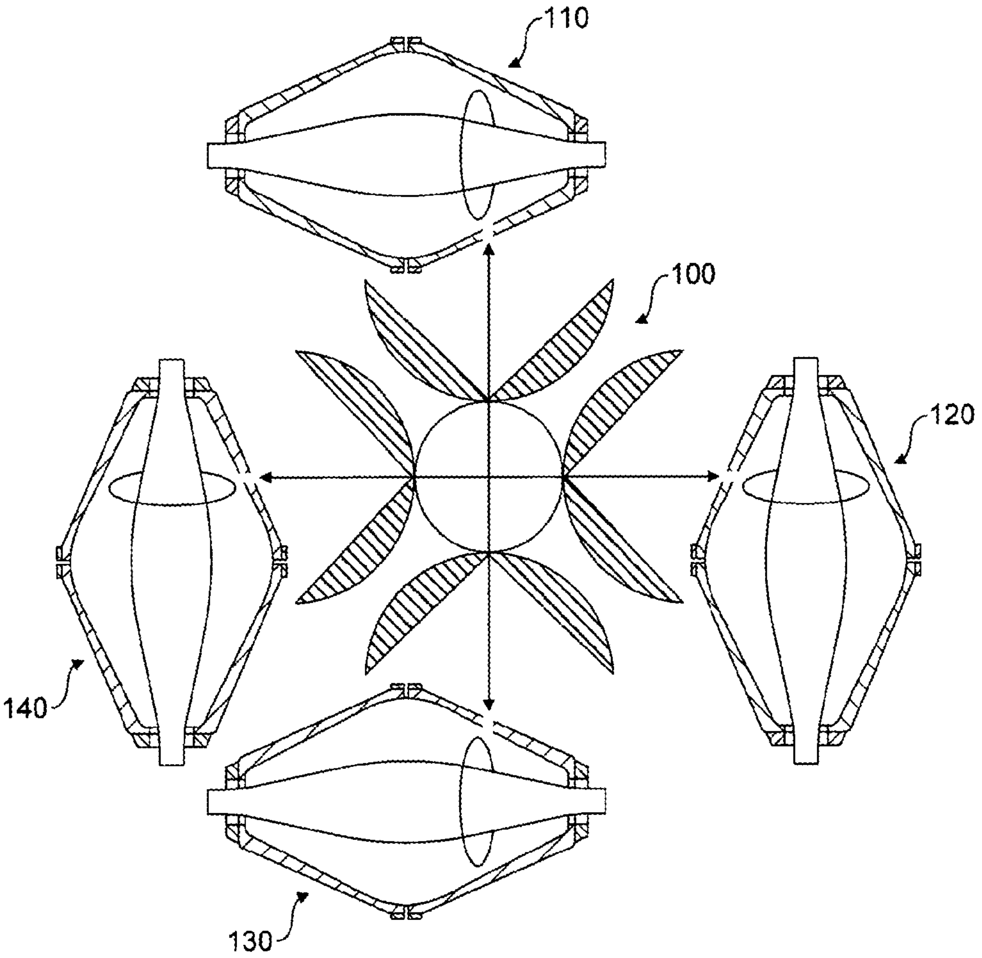
FIG. 2 shows a part of the mass spectrometer of FIG. 1 with an improved pumping and trapping arrangement.

A further improvement may be made by using a single ion storage device. The single ion storage device may be implemented in different ways. Referring to FIG. 2, a part of the mass spectrometer of FIG. 1 is shown. In FIG. 2, the mass spectrometer has a single ion storage device 100 and four mass analysis devices 110, 120, 130, 140.

The ion storage device 100 is gas-filled and is capable of extracting ions in different directions. The ion storage device 100 is powered by a switchable RF power supply, for example a power supply similar to that described in WO-A-05124821.

Advantageously, by using a single ion storage device with multiple mass analysers, a significant cost saving is gained, when compared with the embodiment shown in FIG. 1. Ion storage device 100 maintains an appropriate pressure and temperature, such that the stored ions will be suitable for analysis by each of mass analysis devices 110, 120, 130 and 140. The ion storage device 100 injects ions into each mass analysis device, one at a time. Once sufficient ions have been injected into a mass analysis device, for example mass analysis device 110, this mass analysis device begins to analyse the injected ions. Continuing this example, whilst mass analysis device 110 is performing an analysis, ion storage device 100 injects ions into mass analysis device 120. This procedure is continued for each mass analysis device.

Acquisition of a high-resolution spectrum in each mass analysis device typically requires 200-1000 ms, while ion capture in the ion storage device could occur typically in 5-10 ms (although 100 ms for low-intensity ion beams is possible). Also, ion injection into each mass analysis device takes less than or equal to 1 ms. Therefore, there is sufficient time for ion storage device 100 to inject ions into one mass analysis device whilst at least one other mass analysis device is performing an analysis on previously injected ions. This procedure significantly increases the efficiency of the mass spectrometer.

However, injecting ions from a single ion storage device into multiple mass analysis devices using this arrangement may increase the gas carryover. Hence, in order to ensure that the gas carryover is minimised, the pumping requirements for the mass analysis devices must be increased. Moreover, each mass analysis device requires its own ion optics arrangement for focusing the ion beam on its entrance.

Figure 3:
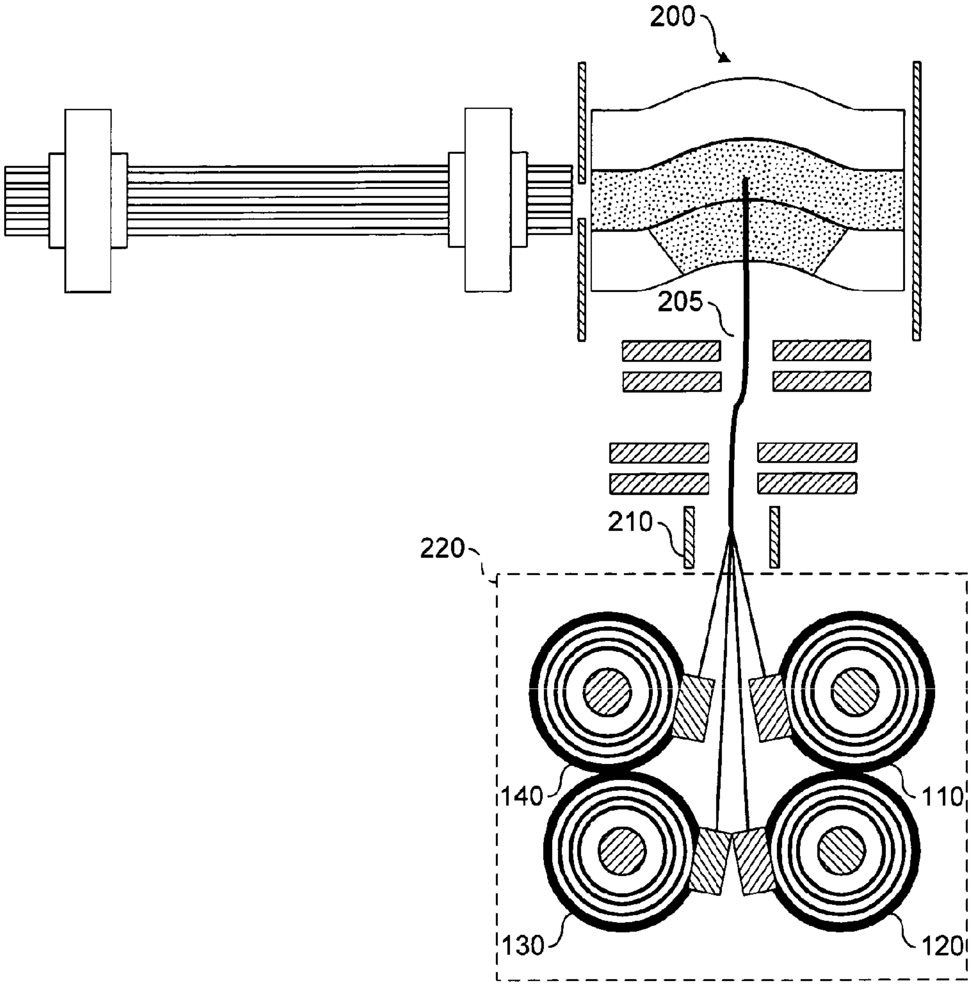
FIG. 3 shows the part of the mass spectrometer shown in FIG. 2, with a further improved pumping and trapping arrangement.

Referring to FIG. 3, a modified version of the part of the mass spectrometer shown in FIG. 2 is shown which addresses these issues. The mass spectrometer comprises ion storage device 200, ion optics 210 and mass analysis devices 110, 120, 130 and 140.

Ion storage device 100 shown in FIG. 2 comprises a plurality of slots, one for each mass analysis device. In contrast, ion storage device 200 comprises only a single slot 205. Ions are ejected in a beam from ion storage device 200 through slot 205. Ion optics 210 are provided for deflecting the ejected ions into a UHV part of the mass spectrometer 220.

The UHV part of the mass spectrometer comprises four mass analysis devices 110, 120, 130 and 140. Ion optics 210 directs the ion beam ejected from ion storage device 200 to one mass analysis device at a time. Additionally, the parameters of the ion optics 210 can be changed to allow a change of ion beam focus, such that the ion beam may be focused onto each mass analysis device. Such change of focal length could be achieved if ion optics 210 and/or ion storage device 200 follow non-concentric arcs.

Further efficiency gains, through the use of an ion storage device together with multiple, parallel mass analysis devices are possible. Depending on the type of analyzer and construction the analysers may share power supplies, heating or cooling, pumping and so on. For example the Orbitrap mass analysis devices in the mass spectrometer may be powered by the same ultra-stable central electrode power supply. This results in a more compact arrangement. Nevertheless, ramping/pulsing and pre-amplification electronics should be individual for each Orbitrap. Even if pulsing of the central electrode on one Orbitrap results in voltage sagging on other Orbitraps during the detection, the duration of this perturbation is only <1-2 ms which is negligible comparing with the total duration of analysis. In this case, peak broadening would occur only at a level close to the baseline and so would not affect the appearance of mass spectra. Moreover, the mass analysis devices may share one or more of a common inlet, common cooler and common injector.

The detection system for each mass analysis device may also benefit from economy of scale, for example by using parallel processing. Alternatively, frequency mixing could be employed, for example by shifting the mass spectrum from one Orbitrap into the range 1 to 2 Mhz, from a second Orbitrap into the range 2 to 3 MHz, a third Orbitrap into the range 3 to 4 MHz, and so on. The combined signal from the plurality of mass analysis devices may then be digitised by a single high-speed analogue to digital converter (e.g. 16-bit, 20 MHz).

Whilst specific embodiments have been described herein, the skilled person may contemplate various modifications and substitutions. For example, the skilled person will understand that any other pulsed mass analysis device may be used instead of Orbitraps, for example FT ICR, RF ion traps, multi-reflection or multi-sector time-of-flight analysers and other types of electrostatic traps. Moreover, the plurality of mass analysis devices may comprise more than one different type of mass analysis device. This arrangement may allow the advantages of different mass analysis devices to be combined, when these mass analysis devices are used in parallel.

The skilled person will also appreciate that irrespective of the type of mass analysis device used, when an ion storage device is used as described herein, components may be shared between the plurality of mass analysis devices. For example, electronic, mechanical, vacuum infrastructure may be shared. In many cases, multiple mass analysis devices may be integrated into one construction. Then, ions may be ejected from the ion storage devices into different parts of this integrated construction. For example, in the case of FT ICR this could be a multiple-segment ICR cell with several independent cells along the same axis inside the magnetic field. For multi-reflection systems, this could be injection of ions onto trajectories propagating at different angles so that they finish on different detectors.

The skilled person will appreciate that any combination of the above embodiments may also be possible. For example, a mass spectrometer may comprise two consecutive ion storage devices, each pulsing ions into two opposite directions, each direction having a deflector to switch the beam between two mass analysis devices. Such arrangement would potentially allow parallel operation of 8 mass analysis devices. Although the gas leak from the ion storage device section of the instrument increases four-fold, the better pumping conductivity of all the elements of the associated ion optics would only require approximately doubling the pumping requirement. Additionally, both ion storage devices may be powered by the same RF supply.

Additionally the skilled person may recognise the advantages in the plurality of mass analysis devices being of different types. For example, the different types may include orbital traps, multi-reflection traps, time of flight detectors, FT/MS detectors, ion traps and similar.

Alternative ways to schedule the operation of a plurality of mass analysis devices according to the present invention may include the following. The mass analysis devices may be operated in sequence, according to a 'round robin' approach, to produce a full mass spectrum. The mass analysis devices may instead be operated in sequence, but with automatic gain control, to produce a full mass spectrum.

In a possible alternative embodiment, different mass analysis devices can be allocated different roles. One example of this is where the types of mass analysers are chosen according to the mass range and mass resolution they can achieve. In an MS-MS experiment for example, the first stage of mass selection for a particular experiment might only be possible using a mass analyser that can operate to select ions of a particularly high mass. However the daughter ions of interest for the second stage of mass analysis will be lower in mass and might be much lower in mass, but might require a higher mass resolution to separate them from neighbouring mass peaks for correct identification. Having one mass analyser that is capable of high mass ion selection and a second capable of high mass resolution at lower mass ranges is an example of a use for the present invention where different mass analysers are allocated different roles.

In addition or alternatively, flexible analysis time periods can be scheduled, in accordance with the present invention. For example, the mass analysis devices can be operated sequentially, according to a 'round robin' approach. Automatic gain control can also be implemented, such that initial measurements can be used to control measurements taken at a later time in either the same or a different mass analyser. Alternatively, as soon as a mass analysis device is inactive, it can be provided ions for a further mass analysis. Hence, the operation of mass analysis devices need not be scheduled in a strict order. This allows freedom of scheduling, but requires a more sophisticated system controller.

The sequence of operation for the mass analysis devices can be optimised by use of preview scans from the detectors. If data from a detector in preview scan shows that the ion packets are not useful, the scan can be discarded and the detector can be made available earlier for a further ion packet to perform further analysis.

This flexible scheduling can be combined with allocated roles for different mass analysers. For instance, a mass spectrometry system with four mass analysers can be considered. Full mass spectrometry can be carried out in analyser 1 and 3, data dependent MS based on preview information in traps 2 and 4 and AGC prescans in an ion trap. Alternatively, full mass spectrometry can be carried out in traps 1 and 3, data dependent mass spectrometry based on preview information in traps 2 and 4 and $MS^3$ in an ion trap. Alternatively, full mass spectrometry can be carried out in trap 1, $MS^2$ in trap 2 and $MS^3$ in traps 3 and 4.

Also possible are: fixed but different roles, for example certain traps being operated at higher resolution.

The invention claimed is:

1. A mass spectrometer, comprising:

an ion source, arranged to generate ions;

an ion storage device, configured to store the generated ions;

a plurality of mass analysers, each arranged to receive ions from the ion storage device for respective mass analysis; and a controller, configured to repeatedly: select a mass analyser from a subset of the plurality of mass analysers, the subset comprising the mass analysers that are available for mass analysis; control the ion storage device to eject stored ions to travel to the selected mass analyser; and control the selected mass analyser to analyse the ejected ions.

2. The mass spectrometer of claim 1, wherein the controller is configured to select a first mass analyser from the plurality of mass analysers, to control the ion storage device to eject stored ions to travel to the first mass analyser so as to provide a first ion sample, to control the first mass analyser to analyse the first ion sample in a first time period, to select a second mass analyser from the plurality of mass analysers, to control the ion storage device to eject stored ions to travel to the second mass analyser so as to provide a second ion sample and to control the second mass analyser to analyse the second ion sample in a second time period; and wherein the first and second time periods at least partly overlap.

3. The mass spectrometer of claim 2, wherein the first ion sample has a first range of mass-to-charge ratios and the second ion sample has a second range of mass-to-charge ratios, different from the first range of mass-to-charge ratios.

4. The mass spectrometer of claim 2, wherein the first mass analyser has a first resolution and the second mass analyser has a second resolution that is different from the first resolution.

5. The mass spectrometer of claim 2, further comprising:

a fragmentation device, arranged to generate fragment ions from received ions; and wherein the controller is configured to control the ion storage device to eject stored ions to travel to the second mass analyser so as to provide a second ion sample by controlling the ion storage device to eject stored ions to travel to the fragmentation device and controlling the fragmentation device to fragment the ion received from the ion storage device so as to provide the second ion sample and to eject the second ion sample to the second mass analyser.

6. The mass spectrometer of claim 2, wherein the controller is configured to control the first mass analyser to analyse the first ion sample so as to provide a preview scan and to control the second mass analyser to terminate analysis of the second ion sample on the basis of the preview scan.

7. The mass spectrometer of claim 1, wherein the ion storage device is a first ion storage device, the mass spectrometer further comprising:

a second ion storage device, configured to store received ions; and wherein the controller is further configured to control the first ion storage device to eject stored ions to travel to the selected mass analyser by controlling the first ion storage device to eject stored ions to the second ion storage device, by controlling the second ion storage device to store the ejected ions and by controlling the second ion storage device to eject the stored ions to the selected mass analyser.

8. The mass spectrometer of claim 7, wherein the second ion storage device is a curved trap.

9. The mass spectrometer of claim 1, wherein the plurality of mass analysers comprise mass analysers of at least two different types.

10. The mass spectrometer of claim 1, wherein each of the plurality of mass analysers is selected from one of the following types: orbital traps; multi-reflection traps; time of flight analysers; multi-sector analysers; FT/MS detectors; FT ICR analysers; RF ion traps; electrostatic traps; and ion traps.

11. The mass spectrometer of claim 1, wherein the plurality of mass analysers are integrated into a single construction.

12. A method of mass spectrometry using a plurality of mass analysers, comprising:

generating ions using an ion source;

storing the generated ions in an ion storage device;

selecting a mass analyser from a subset of the plurality of mass analysers, the subset comprising the mass analysers that are available for mass analysis;

ejecting the stored ions from the ion storage device, to travel to the selected mass analyser;

analysing the ejected ions in the selected mass analyser; and repeating the steps of storing, selecting, ejecting and analysing for further ions generated using the ion source.

* * * * *